Patented Sept. 23, 1924.

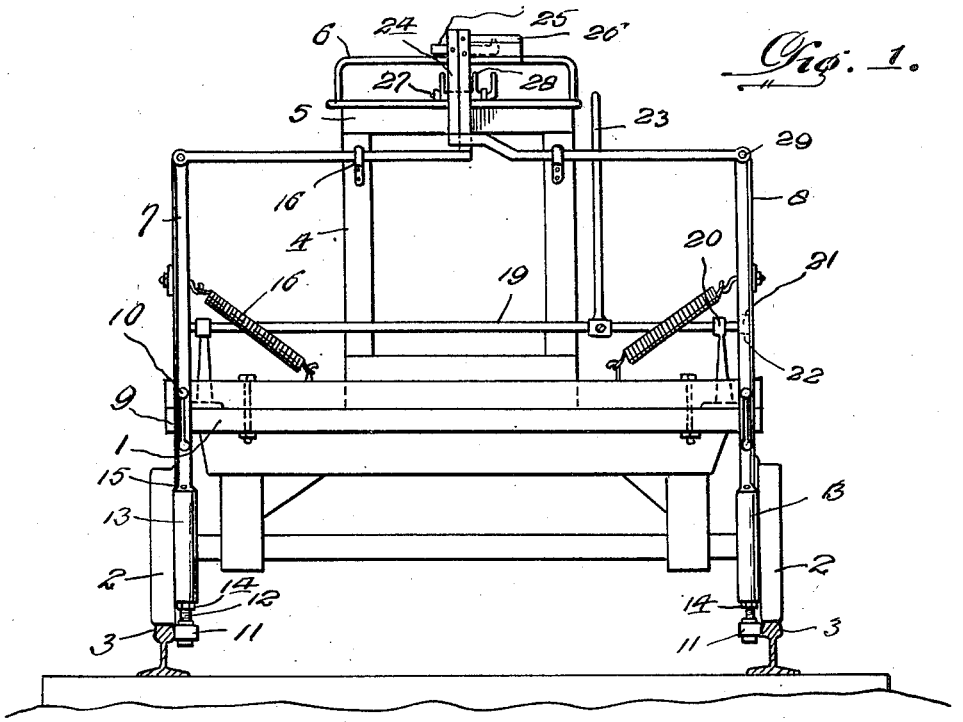

1,509,141

UNITED STATES PATENT OFFICE.

HARRY L. GROVEDAHL, OF WAUKON, IOWA.

TRACK GAUGE.

Application filed January 7, 1924. Serial No. 684,840.

*To all whom it may concern:*

Be it known that I, HARRY L. GROVEDAHL, a citizen of the United States, residing at Waukon, in the county of Allamakee and State of Iowa, have invented certain new and useful Improvements in Track Gauges, of which the following is a specification.

This invention relates to a track gauge adapted to be applied to a vehicle intended to travel over the track and which may be used to advantage for definitely determining the space or distance between the track rails and certain points along the roadway, and it consists in the novel features hereinafter described and claimed.

An object of the invention is to provide a device of the character stated which is of simple structure and which may be applied to any form of vehicle which is to travel upon the track, but preferably the device is intended to be applied to a hand car in order that the track inspector may ride upon the car and determine the condition of the track as the car moves over the rails thus saving time and accurately recording or determining the condition of the track throughout the length thereof over which the car travels.

With the above objects in view, the structure includes a frame composed of sections which are vertically and adjustably mounted upon the platform of the car and which carry at their ends, bearing wheels adapted to travel along the inner surfaces of the heads of the track rails. Means are provided for raising the frame and the wheels above the heads of the rails. Means are provided for locking the sections together when in elevated position in order that the structure may be substantially fixed with relation to the platform of the car.

When the frame is lowered and the parts are in operative position, the sections may move laterally with relation to each other, and this relative movement is observed or recorded in order that the distance or space between the track rails may be observed and determined as the car moves over the track.

In the accompanying drawing:—

Figure 1 is a rear elevational view of a car with the track gauge applied.

Figure 2 is a fragmentary side elevational view of the car with the gauge applied.

Figure 3 is a fragmentary front elevational view of the upper portions of the sections of the track gauge showing the means carried thereby and which indicate the variation in distance between the rails of the track.

As indicated in the accompanying drawing, the car to which the device is applied includes a platform 1 which is suitably supported upon wheels 2 adapted to travel along track rails 3 and in a usual manner. Standards 4 are mounted upon the platform 1 and connected together at their upper ends by a cross bar 5. A guide member 6 is mounted upon the cross bar 5 and is spaced above the same.

The track gauge proper comprises sections 7 and 8 which are similar in many respects but differ from each other in the particulars as will be hereinafter pointed out. The sections of the track gauge are mounted for vertical movement with relation to the platform of the car and each section is provided with a slot 9 which receives a pin 10, the pin being attached to the edge of the platform of the car. Rollers 11 are journaled at the lower ends of the frame section and are adapted to travel along the inner faces or edges of the heads of the rails 3 when the device is in operation. Suitable anti-friction bearings, as for instance, ball bearings, may be employed for journaling the rollers 11 upon the sides of the sections 7 and 8. The rollers 11 are journaled upon pintles 12 which enter sleeves 13 provided at the lower ends of the frame section and the said pintles are locked in adjusted position by means of lock nuts 14 which bear against the lower ends of the sleeves. The sleeves 13 are provided at their upper ends with oil holes 15 through which oil may be introduced and permitted to gravitate through the sleeves and lubricate the bearings of the rollers 11, in a usual manner. Coiled springs 16 are connected at one end with the upper portions of the side members of the sections 7 and 8 and at their other ends with the platform 1 and are under tension with a tendency to hold the frames in their lowered positions and the upper ends of the slots 9 in contact with the pins 10 when the device is in operation. However, in the event that the rollers 11 should encounter obstructions, the springs 16 will elongate and permit the rollers to ride upwardly and over the obstruction, in that the side members of the sections 7 and 8 may move vertically by reason of the pin and slot connection provided between the said sections and the platform of the car.

Cleats 16 are mounted upon the standards 4 and receive the upper transverse portions of the sections 7 and 8 when the said sections are at their lowermost position and as illustrated in Figure 1 of the drawing. Braces 17 are pivotally connected with the platform 1 and the sections 7 and 8 and the said braces are composed of sections which are hingedly connected together as at 18 and as best shown in Figure 2 of the drawing. When the frame sections are raised or lowered, the sections of the braces 17 may swing upon their hinges 18 whereby the frame sections may move vertically and at the same time there will be afforded between the lower portions of the frame sections and the platform, ample bracing to cause the rollers 11 to travel properly along the inner surfaces of the heads of the track rails 3. A shaft 19 is journaled in bearings 20 mounted upon the platform 1 and the said shaft carries at its ends cog wheels 21 which mesh with gear teeth 22 mounted at the sides of the frame sections 7 and 8. A lever 23 is fixed at its lower end to the shaft 19 and at a point between the bearings 20. Therefore it will be seen that as the lever 23 is swung the cog wheels 21 meshing with the gear teeth 22 will raise or lower the frame sections 7 and 8, simultaneously. Thus means are provided for elevating the rollers 11 above the upper surfaces of the heads of the rails 3 and for lifting the frame sections 7 and 8 against the retractile tension of the springs 16. The upper portions of the sections 7 and 8 overlap each other at the median longitudinal dimension of the platform 1 of the car and as best shown in Figure 1 of the drawing. The frame sections 7 and 8 are provided at their inner ends with vertically disposed bars 24 which are arranged edge to edge with respect to each other and which are guided along the guide member 6. One of the bars 24 carries a pointer 25 which is adapted to move over a scale or graduated plate 26 carried by the other bar 24. Therefore when the rollers 11 are in engagement with the inner surfaces of the sides of the track rails and as the car is moving over the track, the frame sections 7 and 8 may be moved laterally with relation to each other and consequently the pointer is moved over the scale or graduated plate and the variation in space between the inner surfaces of the rails at certain points along a track may be observed by one who is standing upon the platform of the car. Also the graduations will indicate the extent or degree of such variation in the space between the opposite rails of the track.

When the rollers are elevated above the heads of the track rails and it is desired to retain the frame sections 7 and 8 against lateral movement with respect to each other this is accomplished by means of a locking device which comprises a shaft 27 journaled upon the cross piece 5 and which is provided with fingers 28 adapted to engage across the outer edges of the bars 24 whereby the inner edges of the bars 24 are held in close proximity with respect to each other and outward movement of the frame sections 7 and 8 is prevented. The upper portions of the side members of the sections 7 and 8 are pivotally connected with the cross members thereof as at 29 and consequently there will be a certain amount of pivotal action between the upper portions of the sections 7 and 8 and the side portions thereof when the rollers 11 are in contact with the inner surfaces of the heads of the rails 3 and consequently the side portions of the sections 7 and 8 may swing upon the pins 10 under the influence of the springs 16 and the upper portions of the frame sections may move horizontally through the cleats 16 whereby the bars 24 will not move in arcs as the rollers 11 travel past inequalities or obstructions or warped sections of the track rails. The shaft 27 and the fingers 28 mounted thereon may serve as a locking means for holding the sections at fixed positions with relation to each other, and the said shaft may be turned whereby the fingers will be disposed transversely of the vertically disposed portions of the sections, thus holding the sections against relative movement.

Having described the invention, what is claimed is:—

In combination with a vehicle adapted to travel upon a track, a track gauge comprising frame sections movably connected with the vehicle and having rollers adapted to engage the track rails, spring means connected with the sections and the vehicle, and adapted to resiliently retain the rollers in contact with the track rails, means for raising and lowering the section simultaneously, means for locking the sections in fixed position with respect to each other and with respect to the vehicle, one of the sections having a pointer and the other section having a graduated indicator over which the said pointer is adapted to move when the sections of the frame move laterally with respect to each other.

In testimony whereof I affix my signature.

HARRY L. GROVEDAHL.